(12) United States Patent
Veness et al.

(10) Patent No.: US 11,330,796 B2
(45) Date of Patent: May 17, 2022

(54) FEEDER

(71) Applicant: Doskocil Manufacturing Company, Inc., Arlington, TX (US)

(72) Inventors: David Veness, Fort Worth, TX (US); Melaney Northrop, Mansfield, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 131 days.

(21) Appl. No.: 16/819,621

(22) Filed: Mar. 16, 2020

(65) Prior Publication Data
US 2021/0000069 A1 Jan. 7, 2021

Related U.S. Application Data

(60) Provisional application No. 62/869,792, filed on Jul. 2, 2019.

(51) Int. Cl.
*A01K 5/02* (2006.01)

(52) U.S. Cl.
CPC .......... *A01K 5/0291* (2013.01); *A01K 5/0225* (2013.01); *A01K 5/0258* (2013.01); *A01K 5/0283* (2013.01)

(58) Field of Classification Search
CPC .. A01K 5/0241; A01K 5/0225; A01K 5/0258; A01K 5/0291
See application file for complete search history.

(56) References Cited

U.S. PATENT DOCUMENTS

| | | | | |
|---|---|---|---|---|
| 4,665,862 A * | 5/1987 | Pitchford, Jr. | ........ | A01K 5/0275 119/51.11 |
| 4,735,171 A * | 4/1988 | Essex | ................... | A01K 5/0291 119/51.12 |
| 4,896,970 A * | 1/1990 | Schuler | .................. | A01K 5/002 366/296 |
| 5,363,805 A * | 11/1994 | Wing | ................... | A01K 5/0291 119/51.11 |
| 6,401,657 B1 * | 6/2002 | Krishnamurthy | .... | A01K 5/0291 119/51.11 |
| 2005/0217591 A1 * | 10/2005 | Turner | ................. | A01K 5/0114 119/51.02 |
| 2013/0333622 A1 * | 12/2013 | Jin | ........................ | A01K 5/0291 119/51.01 |
| 2016/0000036 A1 * | 1/2016 | Cornwell, Jr. | ........ | A01K 5/0114 119/51.11 |

* cited by examiner

*Primary Examiner* — Jessica B Wong
(74) *Attorney, Agent, or Firm* — Global IP Counselors, LLP

(57) ABSTRACT

An automatic pet feeder includes a base, a feed auger, a food container connected to the base, and a food dish connected to the base. The feed auger is disposed for rotating movement within the base. The base is configured to receive food from the food container through an opening and delivery food to the food dish using the feed auger.

12 Claims, 16 Drawing Sheets

FEEDER

CROSS-REFERENCE TO RELATED APPLICATION

This application claims benefit of U.S. Provisional Application No. 62/869,792 filed Jul. 2, 2019, the contents of which are hereby incorporated herein by reference.

BACKGROUND

Field of the Invention

The present invention relates to a feeder. In particular, the present invention relates to an automatic pet feeder.

Background of the Invention

Conventional automatic pet feeders use a programmable timer that allows you to designate when and how much food your dog will be receiving. These feeders can help control an animal's diet. Some conventional pet feeders use gravity to fill the food dish. For example, in some conventional pet feeders when food is eaten from the tray and the exit from the holding compartment is no longer blocked, more food will drop out.

SUMMARY

It has been discovered that an improved pet feeder is desired.

In view of the state of the known technology, one aspect of the present disclosure is to provide an automatic pet feeder with a base, a feed auger, a food container connected to the base, and a food dish connected to the base. The feed auger is disposed for rotating movement within the base. The base is configured to receive food from the food container through an opening and delivery food to the food dish using the feed auger.

BRIEF DESCRIPTION OF THE DRAWINGS

Referring now to the attached drawings which form a part of this original disclosure.

DETAILED DESCRIPTION OF THE EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
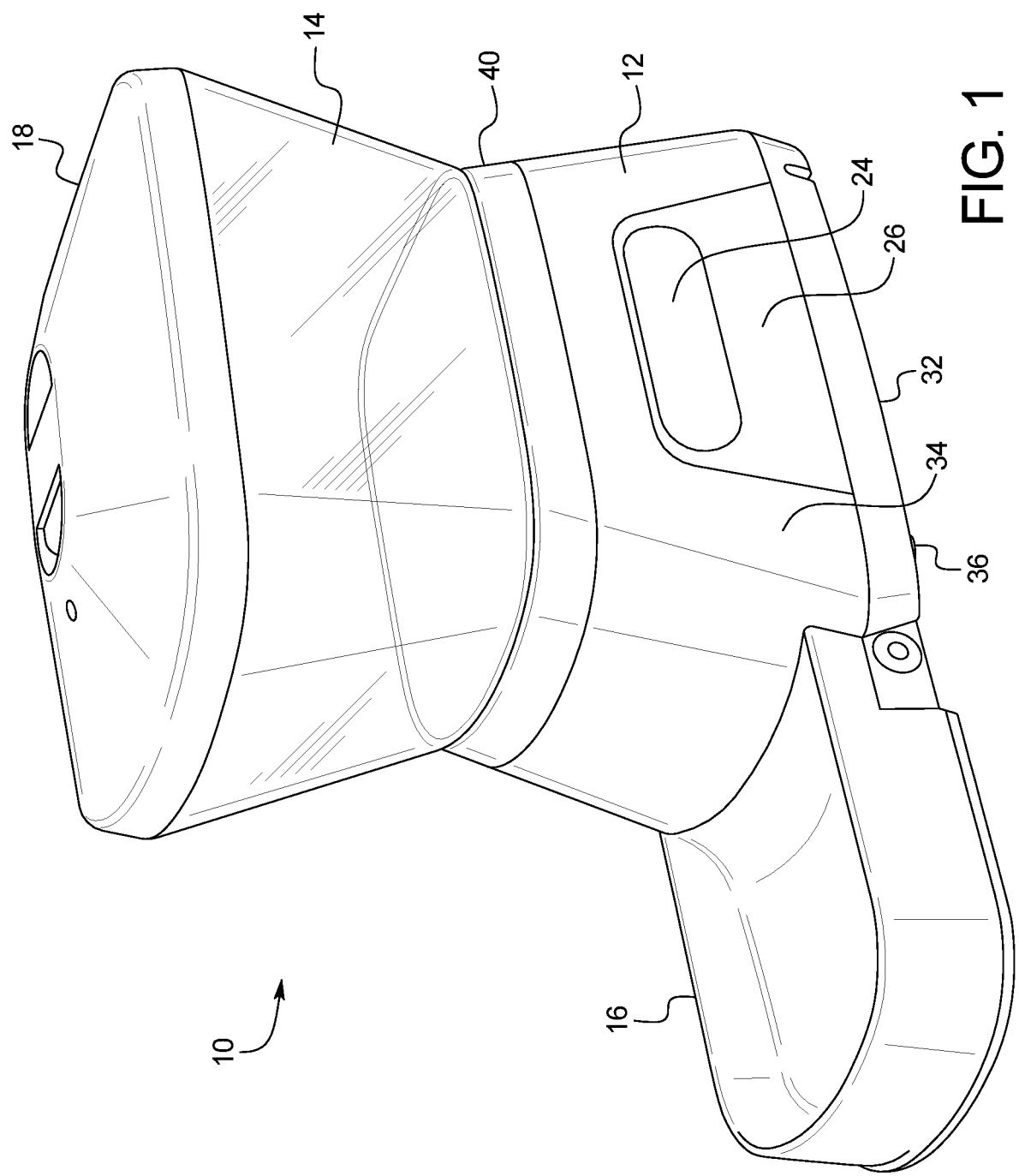
FIG. 1 is a perspective view of a pet feeder having a base with an electronic display/input panel, a feeding tray, a food container and a cover for the food container in accordance with a first embodiment.
Figure 2:
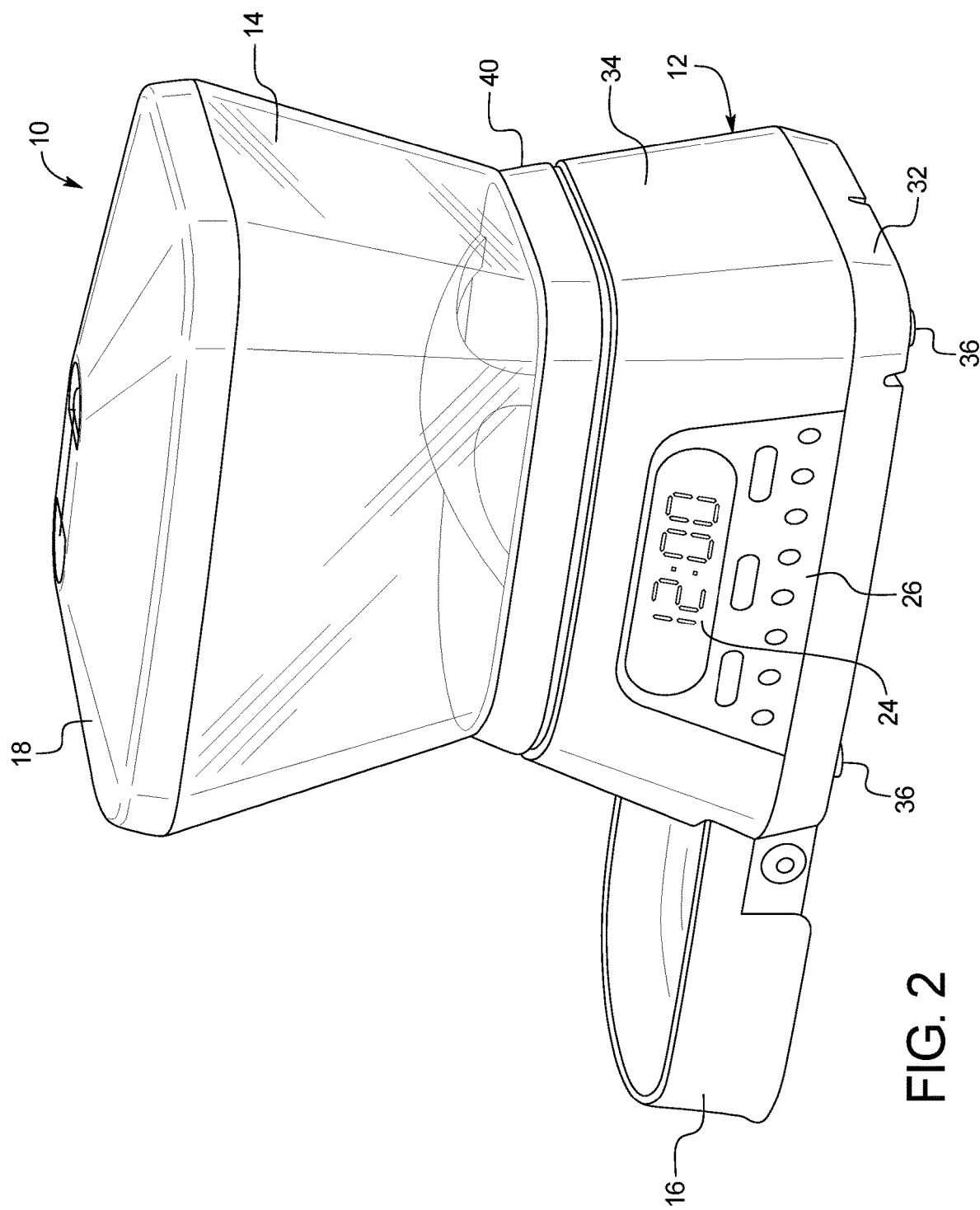
FIG. 2 is another perspective view of the pet feeder showing the base, the electronic display/input panel, the feeding tray, the food container and the cover for the food container in accordance with the first embodiment.

Referring initially to FIGS. 1-2, a pet feeder 10 is illustrated in accordance with a first embodiment. The pet feeder 10 includes a base 12, a food container 14 (also referred to as a hopper 14), a feeding tray 16 (also referred to as a food dish 16) and a cover 18 (also referred to as a removable lid 18).

Figure 13:
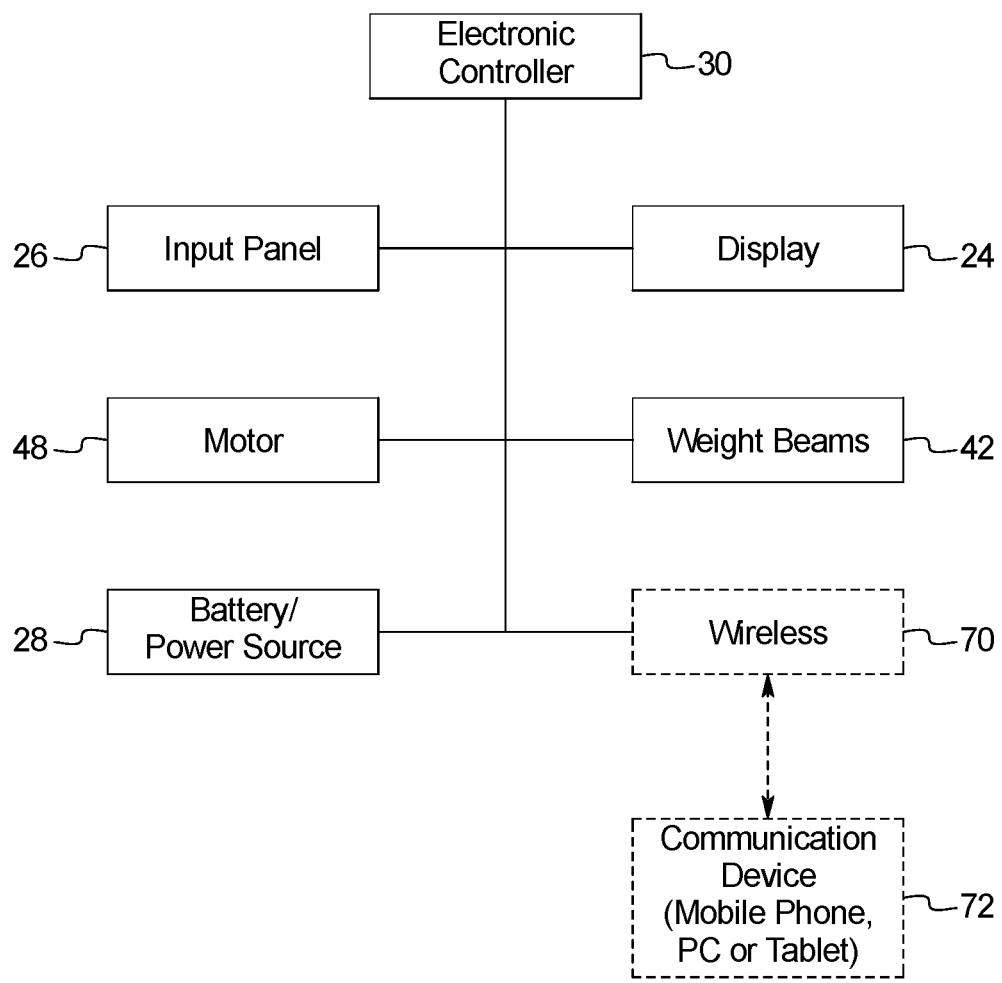
FIG. 13 is a block diagram showing an electronic controller connected to an auger motor, the electronic display/input panel, the weighing device and a wireless communication device in accordance with the first embodiment.
Figure 14:
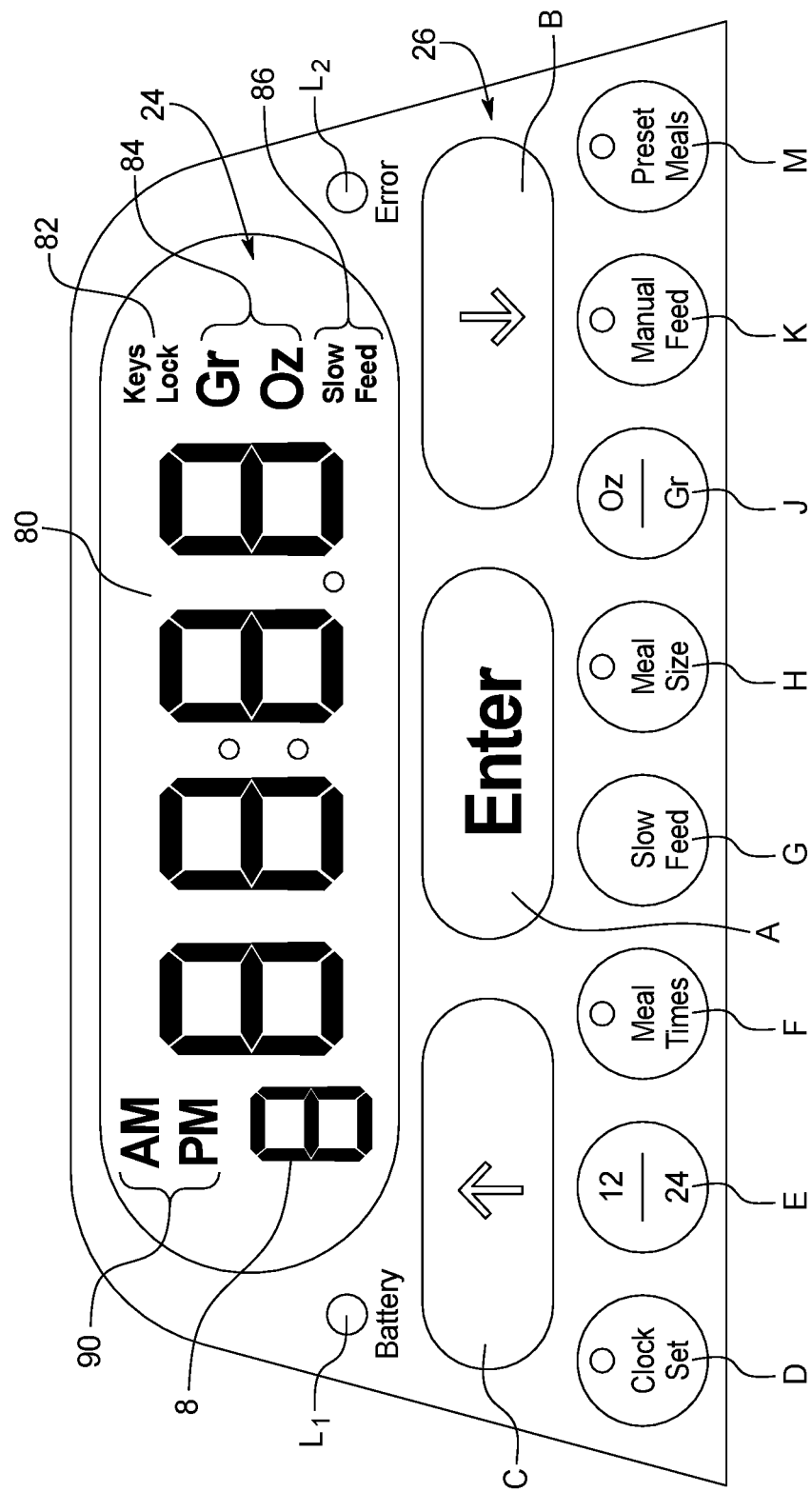
FIG. 14 is a front view of the electronic display/input panel in accordance with the first embodiment.

As shown in FIGS. 1-14, the base 12 includes a weighing device 20 (FIGS. 3 and 14), a feed delivery mechanism 22 (FIGS. 3-9 and 11), or display 24 (also referred to as an LCD screen 24 shown in FIGS. 1-2, 13-18), an input panel 26 beneath the display 24, a power source 28 (shown in FIGS. 5, 6, 9, 11 and 14) and an electronic controller 30 (FIG. 14).

The base 12 further includes a bottom tray 32 with flexible feet 36, wrap around side walls 34, an auger chute 38 and a funnel section 40. The side walls 34 provide the base 12 with a sleek, attractive appearance and can be shaped and/or dimensioned in any of a variety of manners. Specifically, the base 12 is not limited to the depicted shape and appearance, but rather can have any of a variety of shapes and appearances. The base 12 can be formed of a metallic material, or, as shown in the depicted embodiment, can be formed of a molded plastic and/or polymer-based material. The side walls 34 are configured to support the display 24 and the input panel 26, which are described in greater detail below. The auger chute 38 is formed with or fixedly attached to the base 12. The funnel section 40 is a removable member that is separate member of the base 12 and is not fixed to the base 12 or the auger chute 38, as explained below.

Figure 3:
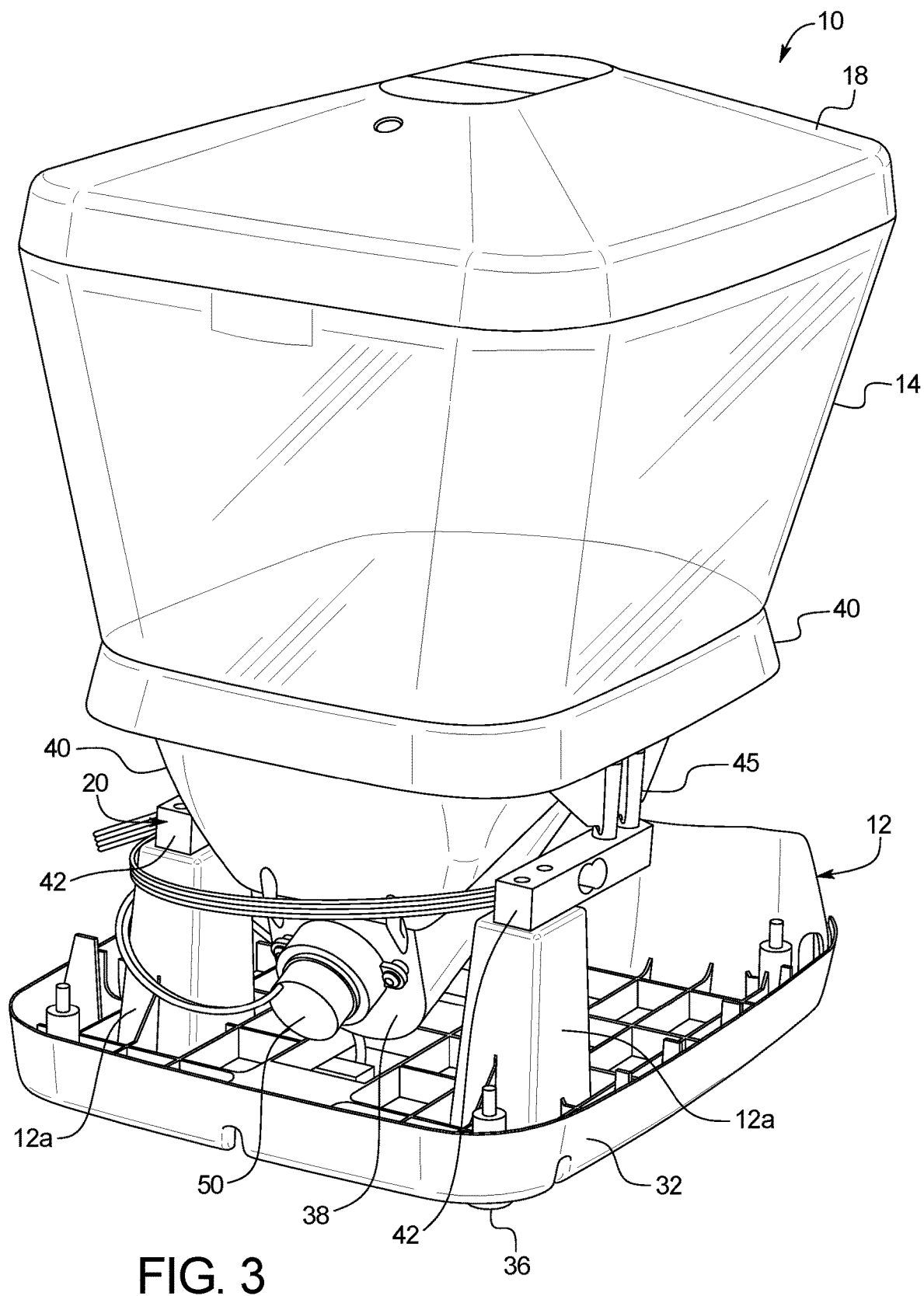
FIG. 3 is a perspective view of the pet feeder showing weighing beams of a weighing device within the base with the feeding tray and side walls of the base removed in accordance with the first embodiment.
Figure 4:
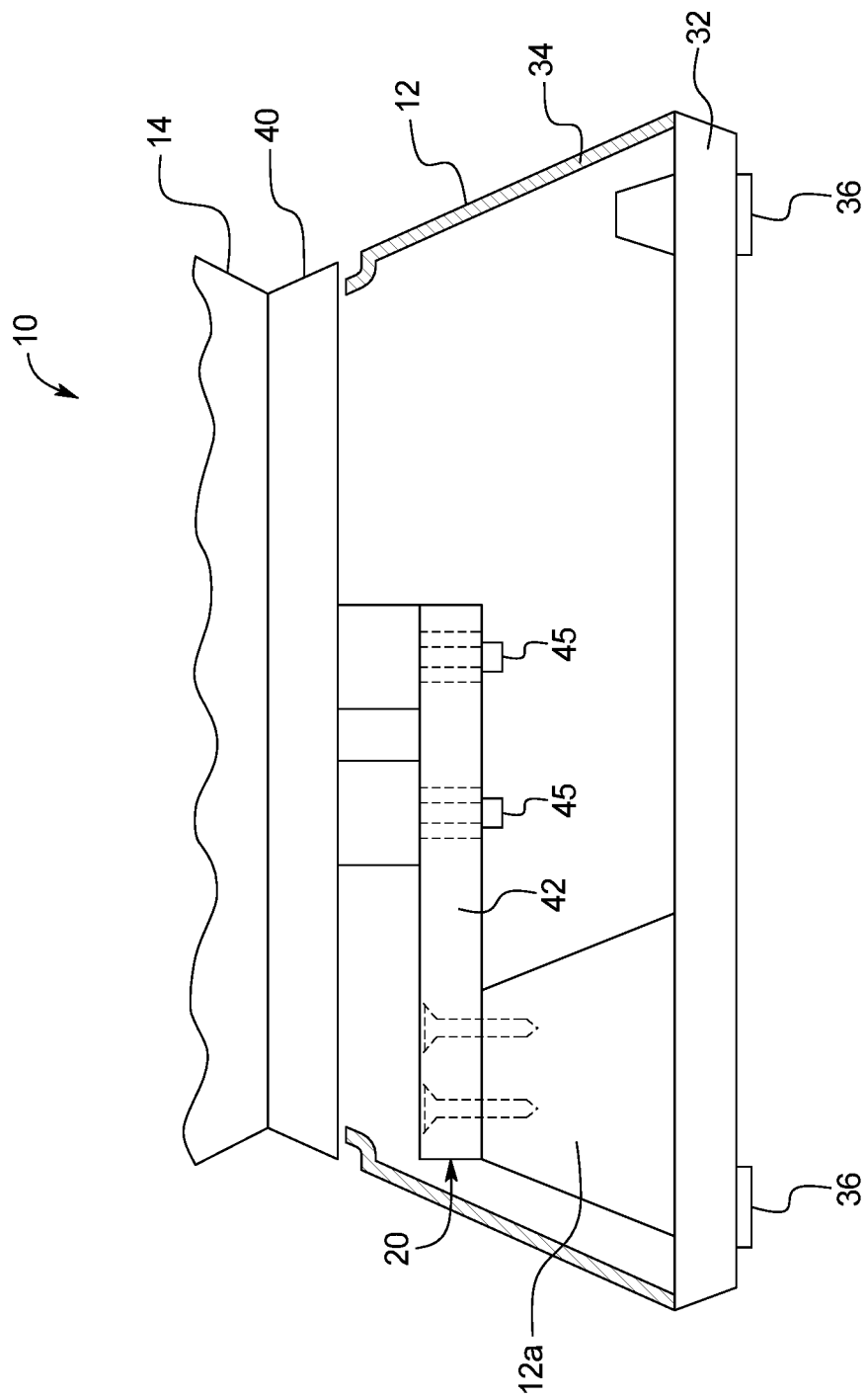
FIG. 4 is a cross-sectional view of the base of the pet feeder showing details of the weighing device in accordance with the first embodiment.

As shown in FIG. 3, the weighing device 20 has two weight beams 42 (weight sensors 42), located on opposite sides of the base 12. The weight beams 42 are identical and therefore description of one weight beam 42 applies equally to both. FIG. 4 shows one of the weight beams 42 with side panels of the base 12 removed or cutaway. The depicted weight beam 42 is fixed at one end to a pillar 12*a* via, for example, mechanical fasteners. The pillar 12*a* can be formed with or fixedly attached to the base 12. Hence, each of the weight beams 42 is cantilevered from a corresponding one of the pillars 12*a* of the base 12.

As shown in both FIGS. 3 and 4, the funnel section 40 rests on respective distal ends of the weight beams 42. The funnel section 40 is provided with pins 45 that insert into openings proximate the distal end of the weight beams 42, thereby keeping the funnel section 40 in a predetermined orientation and location relative to the base 12. The funnel section 40 only contacts the pillars 12*a* of the base 12. The funnel section 40 and the hopper 14 are only connected to the base 12 via the pins 45 and their relationship with the weight beams 42.

As described below, the hopper 14 fits to the top of the funnel section 40. The weight beams 42 are configured to sense the weight of the food within the funnel section 40 and the hopper 14 in a conventional manner based upon, for example, deformation of the weight beams 42 using a Wheatstone bridge as a strain gauge (not shown), piezo, or other similar conventional weight sensing circuitry or device. Since operation of conventional cantilevered weight sensors is well known in the art, further description is omitted for the sake of brevity.

The dual weight beams 42 (the weight sensors 42) of the weighing device 20 improves stability and accuracy. Preferably, the dual weight beams 42 of the weighing device 20 enable an accuracy of about plus or minus one gram. All parts and food above weight beams are weighed and monitored by electronic controller 30, which includes microprocessor as described below. When food is dispensed, the electronic controller 30 controls operation of the feed delivery mechanism 22 based on pre-programmed weight, ensuring accurate food portion size every time. In other words, the electronic controller 30 can be preprogrammed with the weight of the funnel section 40 and the hopper 14 and the response characteristics of the weighing device 20. Thus, when food is added to the hopper 14, the weighing device 20 measures precisely the amount of food added and stores this information in memory or a storage device of the electronic controller 30.

Figure 5:
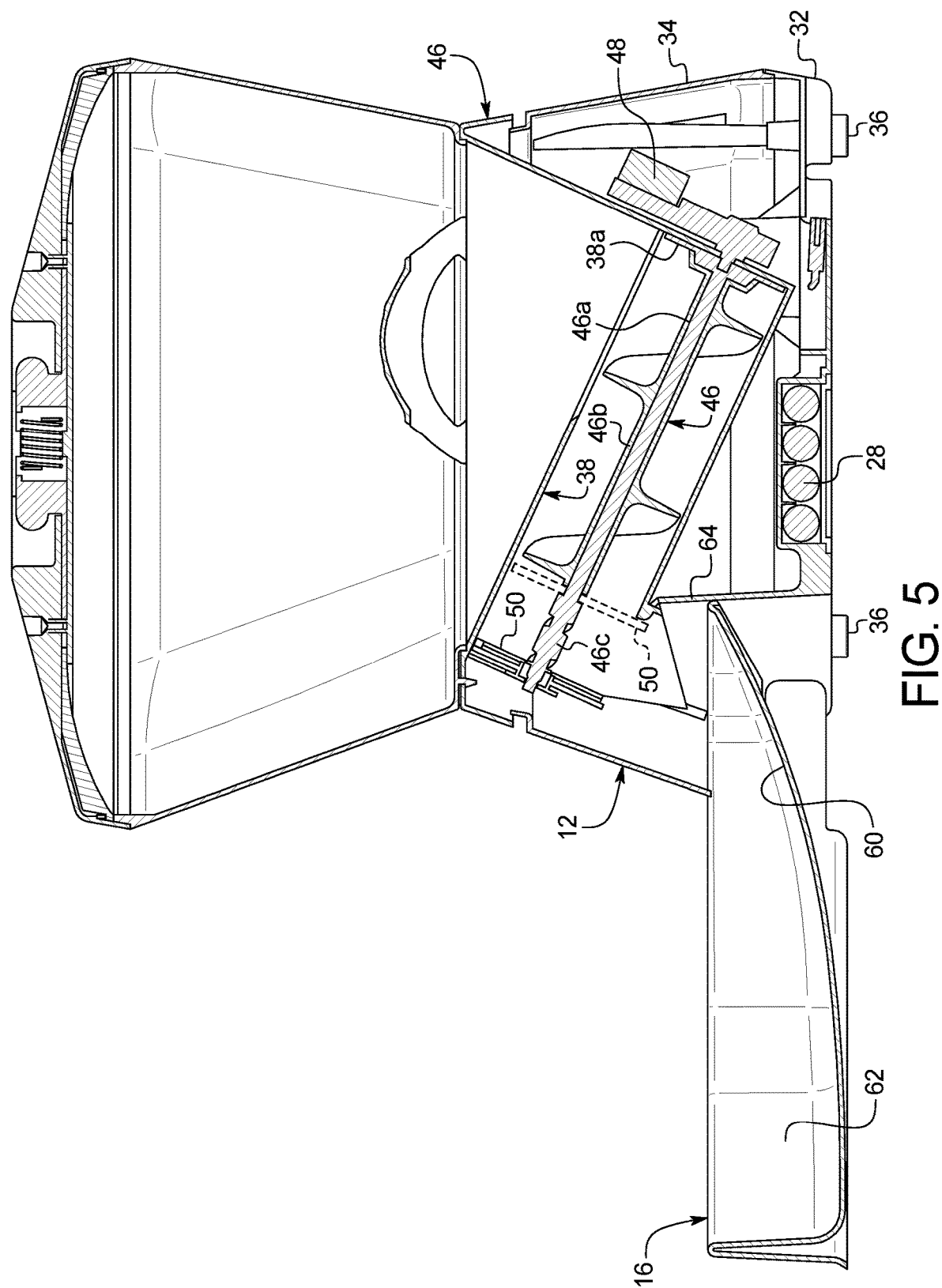
FIG. 5 is another cross-section of the pet feeder showing details of the base, the feeding tray, the food container and the cover, and further showing details of a feed delivery mechanism and auger thereof of the base in accordance with the first embodiment.
Figure 6:
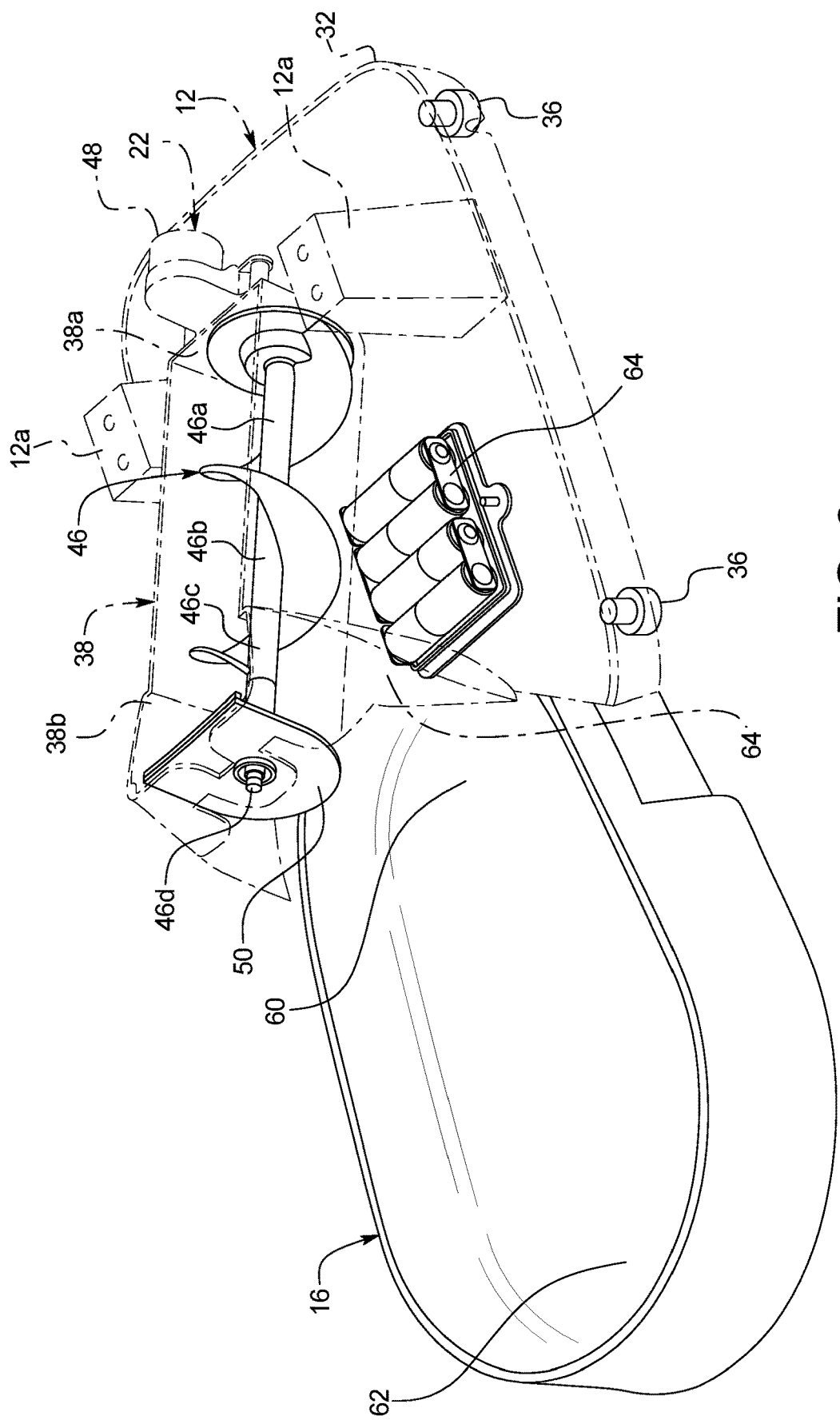
FIG. 6 is a perspective view of the base and the feeding tray with the food container and the side walls of the base removed showing further details of the auger of the feed delivery mechanism in accordance with the first embodiment.
Figure 11:
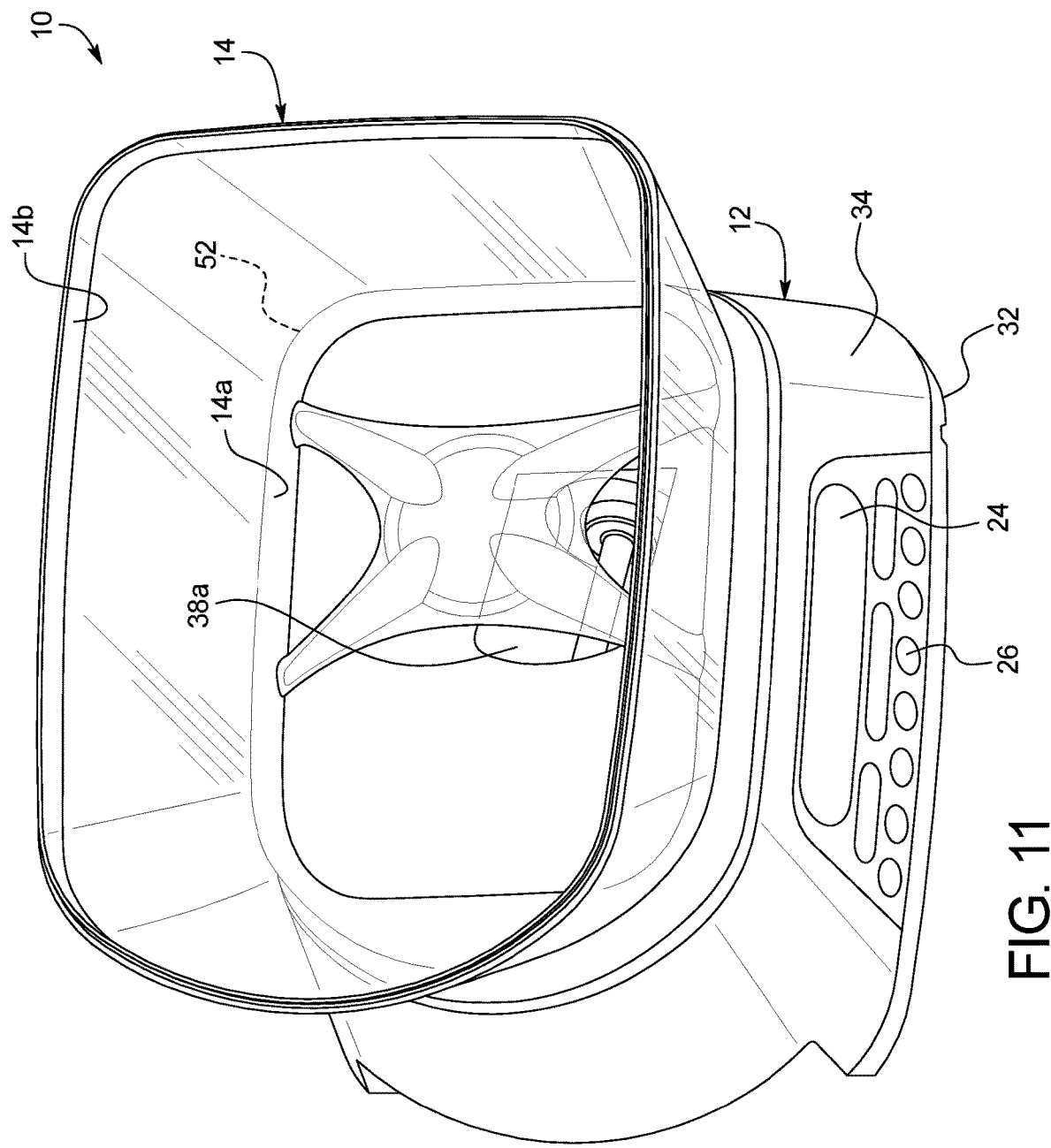
FIG. 11 a top perspective view of the pet feeder with the cover removed showing the baffle within the food container in accordance with the first embodiment.

As illustrated in FIGS. 3, 5-9 and 11, the feed delivery mechanism 22 is centrally located within the auger chute 38. Further, the auger chute 38 and hence the feed delivery mechanism 22 are centered between the weight beams 42. As shown in FIGS. 5, 6 and 11, the auger chute 38 has a first end 38*a* and a second end 38*b*. The first end 38*a* is lower than the second end 38*b*. More specifically, as shown in FIG. 11, the first end 38*a* is open to the funnel section 40 such that food can drop through the funnel section 40 from the hopper 14 into the auger chute 38. The second end 38*b* (the higher end) is higher than the first end 38*a* and is open to the feeding tray 16 (the food dish 16). An auger 46 is installed within the auger chute 38 and is rotated by a motor 48, the motor 48 being controlled by the electronic controller 30 in a manner described further below.

The auger 46 includes three sections, a lower end section 46*a* connected to the motor 48, a mid-section 46*b* having a spiral auger blades that moves food from the first end 38*a* to the second end 38*b* of the auger chute 38 when rotated in a first direction, and, an upper end 46*c* that is formed with helical (or spiral) threads. The lower end section 46*a* and the upper end section 44*c* are further supported for rotational movement by bearings (not shown) within the base 12 at opposite ends of the auger chute 38. A door 50 is installed to the upper end 44*c* of the auger 46, as shown in FIGS. 5-9.

Figure 7:
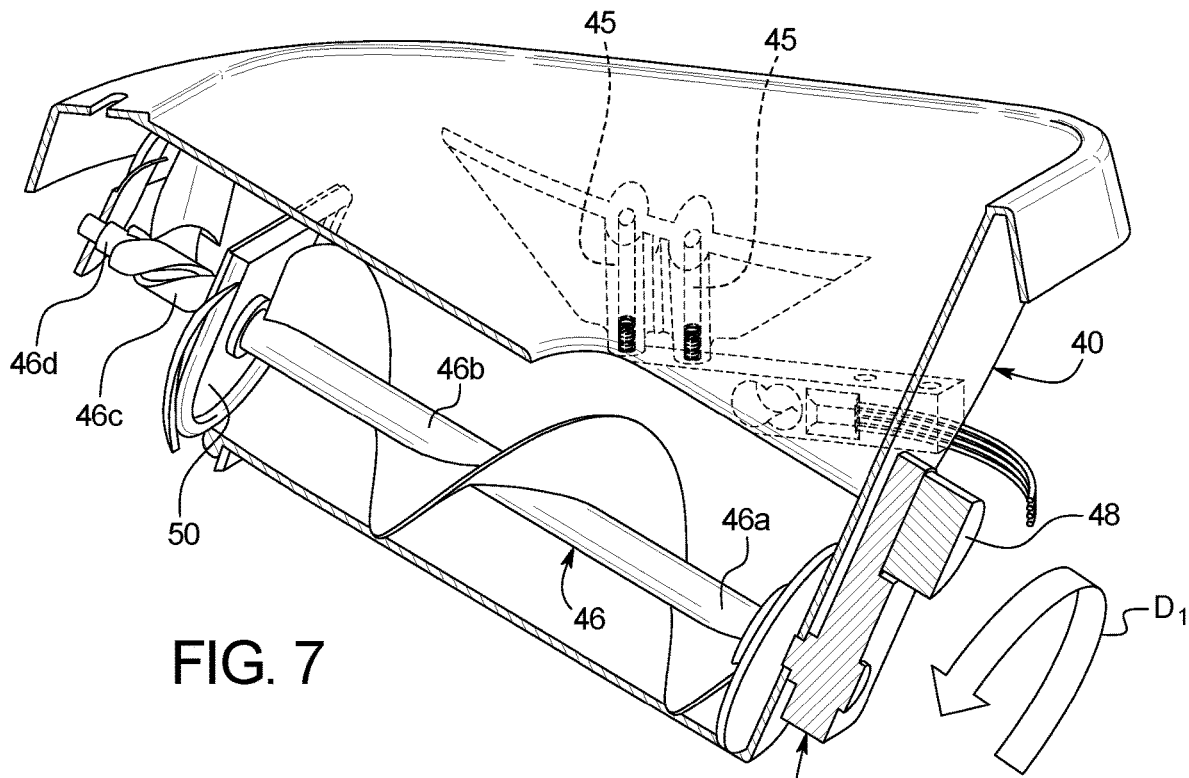
FIG. 7 is a side view of the auger and a lower portion of the food container removed from the base showing a door moved to a closed orientation by rotation of the auger in accordance with the first embodiment.
Figure 8:
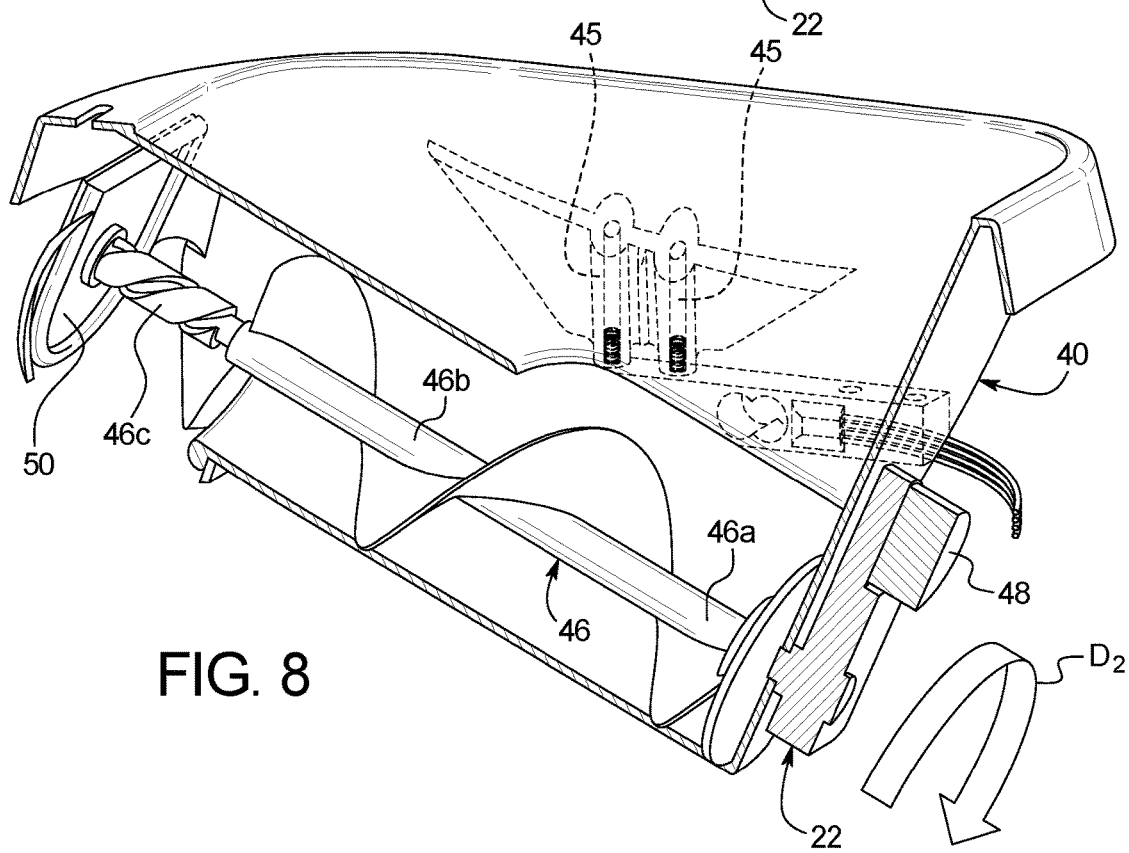
FIG. 8 is another side view of the auger and a lower portion of the food container removed from the base showing the door moved to an open orientation by rotation of the auger in accordance with the first embodiment.

As shown in FIG. 7, when the auger 46 is rotated in a first direction $D_1$, the door 50 is moved along the helical threads to a closed orientation. As shown in FIG. 8, when the auger 46 is rotated in a second direction $D_2$, opposite the first direction $D_1$, the door 50 is moved along the helical threads to an open orientation to a thread-less section 46*d* such that the auger 46 can continue rotating. Continued rotation of the auger 46 in the second direction $D_2$ causes food within the auger chute 38 to be moved by the spiral auger blades of the auger 46 toward the second end 38*b* of the auger chute 38 and into the feeding tray 16. It should be understood from the drawings and the description herein that the door 50 can be spring biased by a spring (not shown) or by a square upper end thereof to be urged toward the upper end section 46*d* in order to re-engage the helical threads of the upper end section 46*d* when the auger 46 is rotated in the first direction $D_1$ such that the door 50 can be moved to the closed orientation.

The door 50 has a lower end that is curved to conform to the overall shape of the auger chute 38. The upper end of the door 50 has a square or rectangular shape that conformed to a portion of the second end 38*b* of the auger chute 38 thereby preventing rotation of the door 50 relative to the auger chute 38 and the base 12. The spiral auger blades or flutes of the auger 46 can be made of metal like the shaft section of the auger 46, or alternatively, can be made of a flexible material that flexes when food jams the auger chute 38. Thus, food within the auger chute 38 is transported up the incline of the auger chute 38 and dropped into the feeding tray 16. The door 50 can be made of metal with a periphery including a rubber-like or flexible material that provides a seal to keep food fresh. Alternatively, the entire door 50 can be made of a rubber-like or polymer material with sufficient flexibility to provide a seal at the second end 38*b* (upper end 38*b*) of the auger chute 38.

Rotation of the auger 46 is made possible by a mechanical connection to the motor 48. The motor 48 transmits rotational power to the auger 46 via direct gearing or a belt drive. Since direct gearing systems and belt drives are convention mechanical features, further description is omitted for the sake of brevity.

The motor 48 is connected to the power source 28 (also referred to as a power supply 28) and the electronic controller 30, with the electronic controller 30 being configured to control the power provided to the motor 48 and control the direction of rotation of the auger 46 via control of the motor 48. The motor 48 drives the feed delivery mechanism 22, including the auger 46 (also referred to as a worm gear). When the motor 48 is activated by the electronic controller 30 the auger 46 rotates. Hence, the rotation of the auger 46 opens the door 50 and moves food through the auger chute 38 and into the feeding tray 16, and, reversing of direction closes the door 50.

Figure 9:
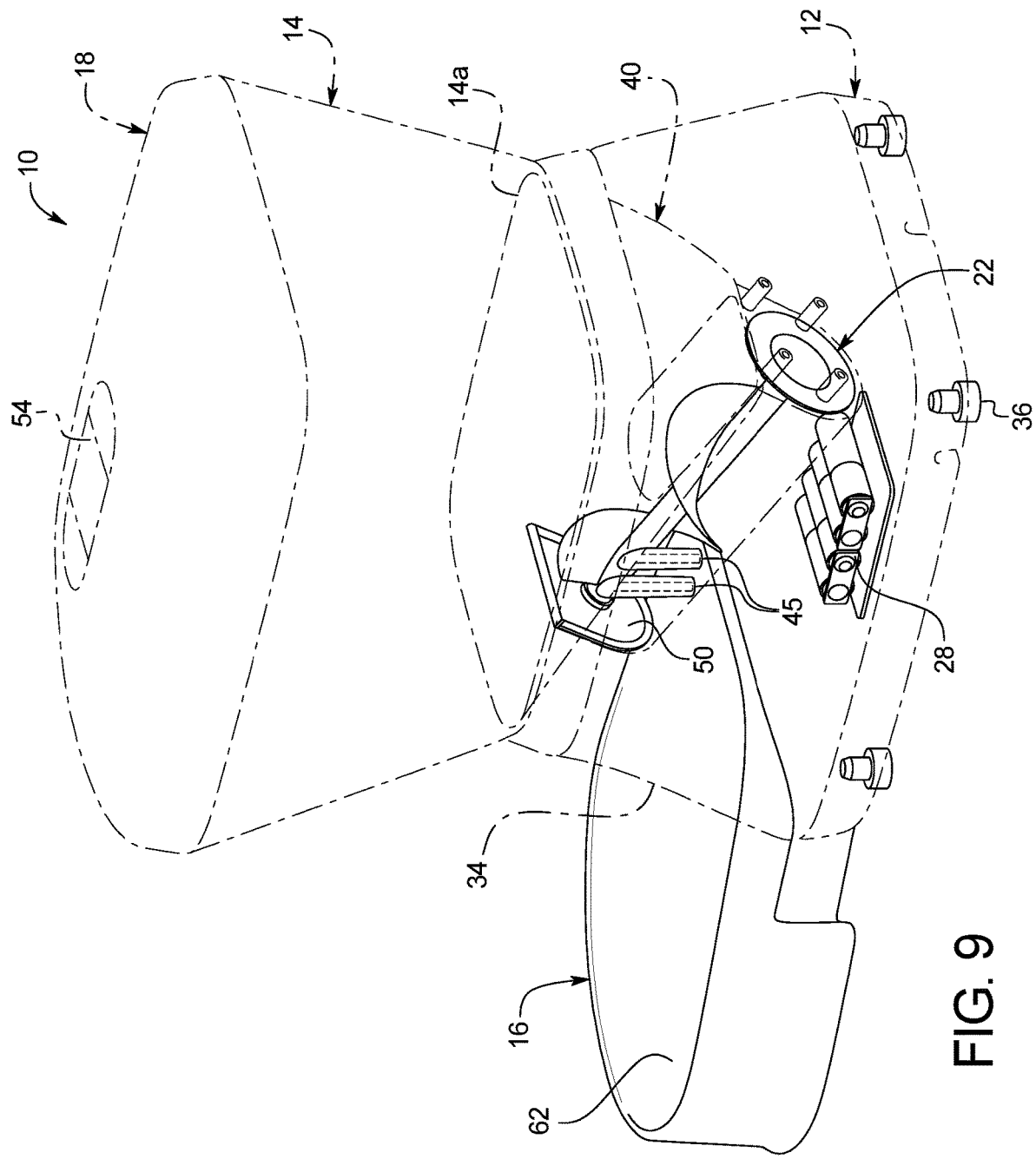
FIG. 9 is a further perspective view of the pet feeder showing details of a power source in accordance with the first embodiment.
Figure 10:
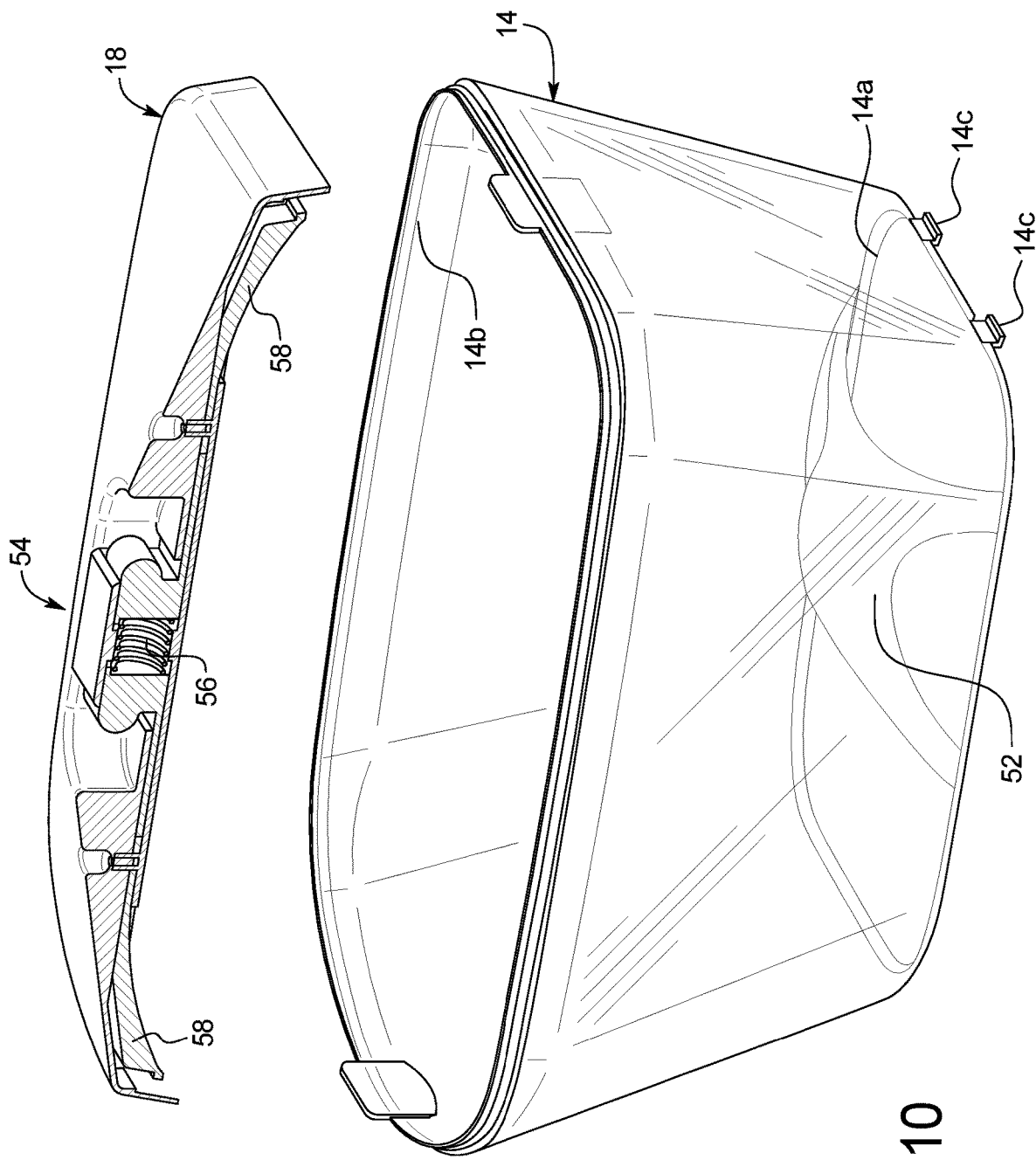
FIG. 10 is an exploded perspective view of the food container and the cover removed from the pet feeder showing a baffle within the food container in accordance with the first embodiment.

In the depicted embodiment, as shown in FIGS. 5, 9 and 10, the food container 14 (the hopper 14) is manufactured in a molding process using a plastic or polymer-based material and is at least partially transparent or translucent such that food within the food container or hopper 14 is visible therethrough. The food container 14 includes a bottom opening 14a, a top opening 14b and a pair of alignment tabs 14c that extend outward and away from the bottom opening 14a.

The hopper 14 is attached to and removable from the funnel section 40 for ease of cleaning. More specifically, the alignment tabs 14c project outward away from the hopper 14 and fit into corresponding openings (not shown) along the top of the funnel section 40. The hopper 14 can also include a baffle 52 at a lower end thereof to ensure proper food flow. Specifically, the baffle 52 can be molded to the interior of the hopper 14, or, can be a separate element that can be removed from the hopper 14. The bottom opening 14a of the hopper 14 feeds into the auger chute 30 and is aligned with a corresponding opening at the first end 38a of the auger chute 38 such that food within the hopper 14 can flow into the funnel section 40 and through the opening at the first end 38a of the auger chute 38.

The baffle 52 is shaped and positioned such that when the hopper 14 is full, the weight of food above the baffle 52 is carried by the baffle 52, thereby preventing or minimizing the possibility of the food clogging or jamming the first end 38a of the auger chute 38 and the lower end section 46a of the auger 46. More specifically, the baffle 52 can reduce forces from the weight of food that would otherwise be greatest at the first end 38a of the auger chute 38. The reduction of forces (weight of food) provided by the inclusion of the baffle 52 reduces wear and tear on moving parts and helps prevent food jams.

A seal is provided around the bottom opening 14a of the hopper 14 in order to seal the interior of the hopper 14, interior of the funnel section 40 and the auger chute 38, thereby keeping food within the hopper 14 and the funnel section 40 fresher.

The top opening 14b of the hopper 14 and/or the cover 18 are also provided with sealing material or gasket such that with the cover 18 installed to the hopper 14, food therein can be kept fresh.

As shown in FIGS. 5 and 10, the top opening 14b of the hopper 14 is covered by the cover 18. The cover 18 is removable and includes a locking mechanism 54. The locking mechanism 54 is spring biased such that with a portion of the cover 18 inserted into the top opening 14b of the cover 18, the spring 56 urges locking members 58 into contact with interior surface portions of the hopper 14 locking the cover 18 to the hopper 14. Thus, pets have difficulty removing the cover 18 from the hopper 14. More specifically, the locking mechanism 54 of the cover 18 can be an interlocking lid that is easily removed but cannot be dislodged by a pet. As mentioned above, the hopper 14 can be at least partially transparent. However, the cover 18 need not be transparent. The top surface of the cover 18 can further be shaped or contoured with a convex shape that makes it difficult for a pet to sit on the cover 18. Sometimes pets attempt to sit or lay on top of the cover 18 awaiting a next meal which can cause scale mis-read.

The feeding tray 16 (the food dish 16) is shown in FIGS. 5 and 6 and can also be made of molded plastic or polymer-material and is removably connectable to the base 12. The feeding tray 16 includes an upward extending surface 60 or wall 60 shaped to prevent food from spilling. The wall 60 serves as a ramp for convenient delivery of the food from the auger chute 38 of the base 12 into the feeding tray 16. In one embodiment, the wall 60 of the feeding tray 16 is a large and a well sloped surface that enhances food flow. The surface defined on the wall 60 is ramp that is highly polished and slick to increase the movement of the food along the wall 60. The remainder of the feeding tray 16 defines a bowl 62 that holds large meals. The feeding tray 16 snaps into place to the base in a conventional manner and is removable for easy cleaning.

Further as shown in FIG. 5, the base 12 can have a shield 64 that extends downward from the second end 38b of the auger chute 38 to avoid overflow over the backside of the feeding tray 16. Moreover, the feeding tray 16 can have a narrow to wide configuration or shape that facilitates food moving to the bowl 62 of the feeding tray 16.

Figure 12:
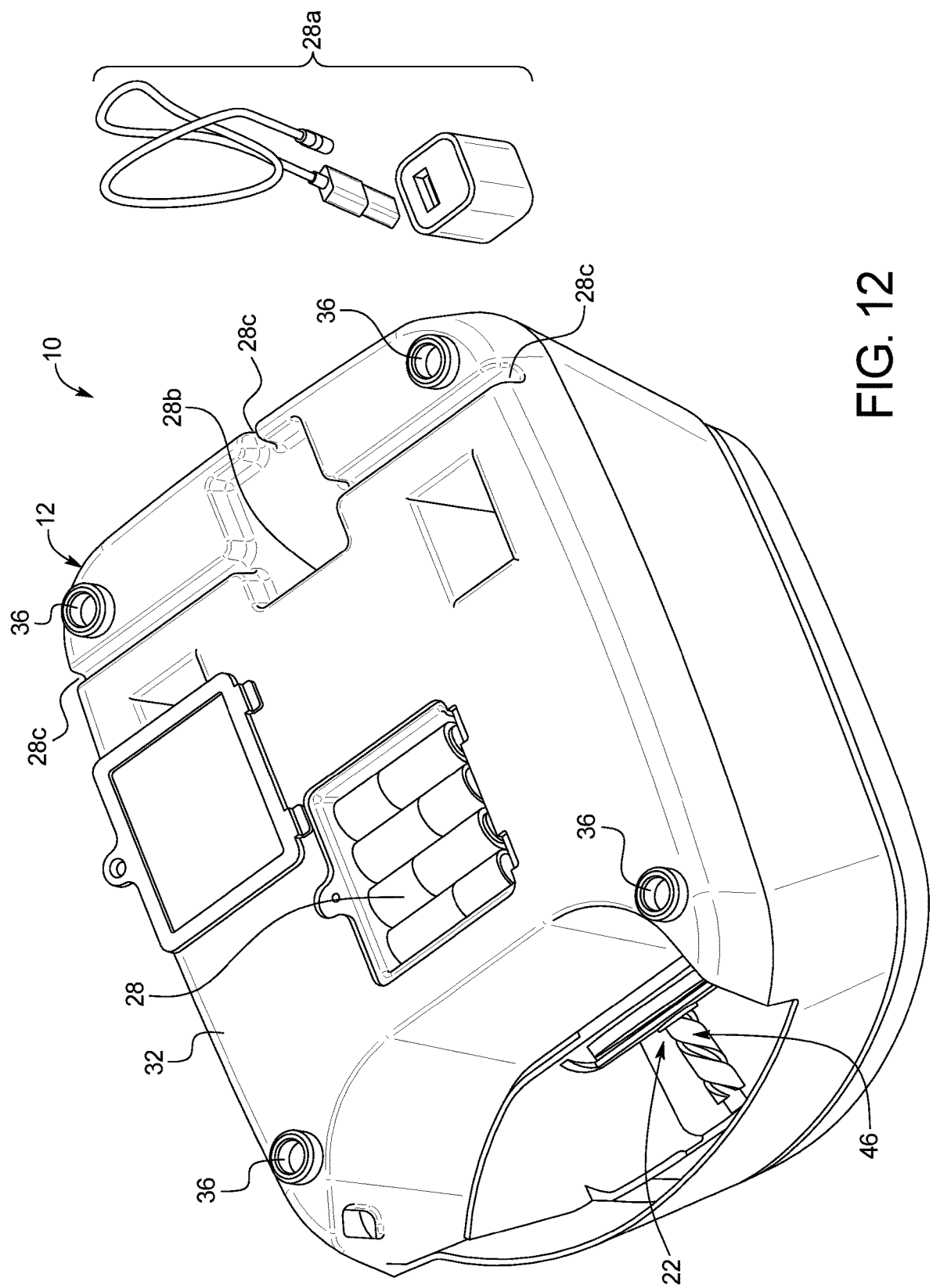
FIG. 12 is a bottom view of the base of the pet feeder showing details of the power sources in accordance with the first embodiment.

As shown in FIGS. 1-2 and 11, the side walls 34 includes the display 24 (an LCD screen 24) and the input panel 26. The electronic controller 30 can be integrated within one or both of the display 24 and the input panel 26. The electronic controller 30 and motor 48 are supplied with power from the power source 28. As shown in FIG. 12, a bottom surface of the bottom tray portion 32 of the base 12 includes a battery receiving area for batteries that define a part of the power source 28. An auxiliary cable and plug 28a can further be provided for the pet feeder 10. The bottom tray portion 32 includes a jack 28b that receives one end of the cable 28a. Recesses 28c can be used to conceal the cable 28a, if used.

As shown in the block diagram depicted in FIG. 13, the electronic controller 30 is connected to the display 24, the input panel 26, the battery/power source 28, the weight beams 42, the motor 48 and an optional wireless communication device 70 that communicates wirelessly with, for example, an optional mobile communication device 72.

The electronic controller 30 preferably includes a microcomputer with a control program that controls the feed delivery mechanism 22 and the display 24, and processes weight measurement signals from the weighing device 20, as discussed below. The electronic controller 30 is also configured to receive input data related to operation of the feed delivery mechanism 22 from the input panel 26 and/or the mobile communication device 72, as is also discussed further below. The electronic controller 30 can also include other conventional components such as an input interface circuit, an output interface circuit, and storage devices such as a ROM (Read Only Memory) device and a RAM (Random Access Memory) device. The microcomputer of the electronic controller 30 is programmed to control the feed delivery mechanism 22 and the display 24. The memory circuit stores processing results and control programs such as ones for feed delivery mechanism 22 and the display 24 operation that are run by the processor circuit and both pre-programmed weight related data and current measurements from the weighing device 20. The internal RAM of the electronic controller 30 stores feed delivery mechanism data and the display data and statuses of operational flags and various control data. The electronic controller 30 is capable of selectively controlling any of the components of the control system in accordance with the control program. It will be apparent to those skilled in the art from this disclosure that the precise structure and algorithms for the controller can be any combination of hardware and software that will carry out the functions of the present invention.

Figure 15:
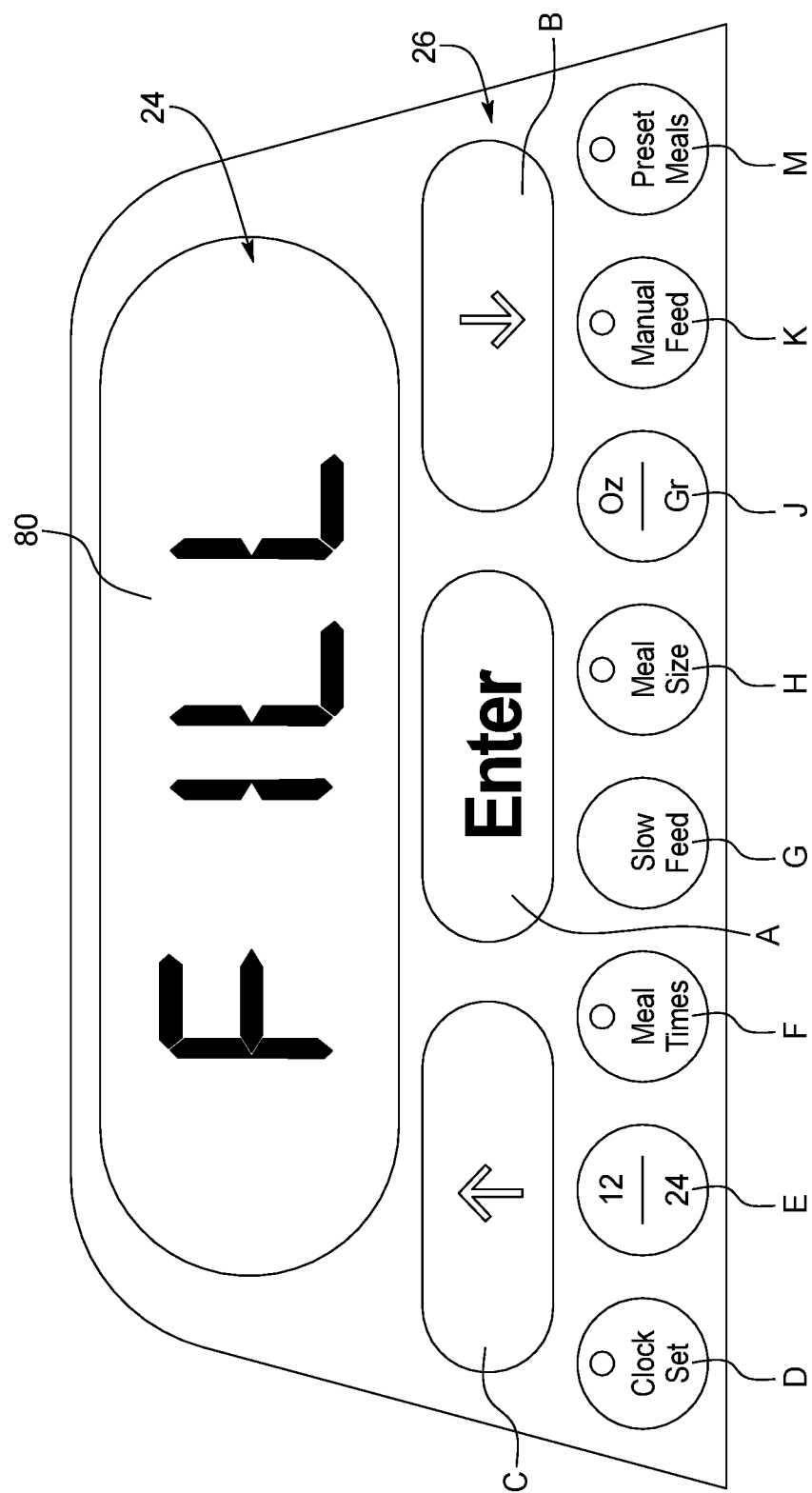
FIG. 15 is another front view of the electronic display/input panel in accordance with the first embodiment.

FIGS. 14-15 show the display 24 and the input panel 26 mounted to the base 12. Although visible in FIGS. 14 and 15, in the depicted embodiment the electronic controller 30 is integrated into a single housing that includes the display 24 and input panel 26. Specifically, the electronic controller 30 is hidden behind the display 24 and/or the input panel 26. In other words, the display 24, the input panel 26 and the electronic controller 30 are manufactured as a single element mounted to the side wall 34 of the base 12. Alternatively, the electronic controller 30 can be a separate element installed within the base 12 spaced apart from the display 24 and the input panel 26.

A description of the display 24 and the input panel 26 is now provided with specific reference to FIGS. 14 and 15. The display 24 includes the following sections: a clock section 80, a keypad lock status section 82, a weight display section 84, a dispensing speed section 86, a meal number section 88 and a clock format section 90.

The clock section 80 is configured to display the current time as well as other information. For example, as shown in FIG. 15, the electronic controller 30 can display FILL in response the weighing device 20 providing weight information that indicates that the food container 14 is empty or almost empty. In response to data input by a user or operator (for example, the pet owner), the electronic controller 30 stores a selected current style of the displaying in the clock section 80, such as a 12 hour clock system (with AM or PM displayed in the clock format section 90) or a 24 hour clock system (with the clock format section 90 displaying an indication of a 24 hour clock being displayed. The keypad lock status section 82 displays whether or not the input panel 26 is locked or ready to receive manually inputted selections and/or data inputted by a pet owner. The electronic controller 30 can store a passcode that locks/unlock the input panel 26.

The weight display section 84 of the display 24 displays the type of weight being displayed, for example, in grams or in ounces. The clock section 80 can be operated to display the amount (measured weight) of food delivered to the feeding tray 16 in grams or ounces.

The dispensing speed section 86 can display the speed selected by the pet owner for dispensing feed to the feeding tray 16. For example, using the input panel 26, the pet owner can select rapid, medium or slow feed. The selected speed is displayed. Consequently, the electronic controller 30 controls speed of rotation of the auger 46 (via motor 48) during each programmed feed dispensing cycle.

The meal number section 88 is plays the number of meals or food dispensing cycles have occurred since being reset by the pet owner. Alternatively, the meal number section 88 can be operated by the electronic controller 30 to display the number of meals dispensed since the last re-filling of the food container 14, depending upon pet owner programming of the electronic controller 30.

The clock format section 90 displays AM or PM if the time is displayed in the clock section 80 is set to display using 12-hour cycles. If the electronic controller 30 received instructions to display in a 24-hour format, then the number 24 is displayed in the clock format section 90.

It should be understood from the drawings and the description herein that the display 24 can be an LCD screen or other type of display. The screen of the display 24 is preferably large and easy to read. The input panel 26 can be keypad that includes large easy to press buttons, or can be a touch screen that is part of the display 24.

The display 24 and/or input panel 26 includes a battery low indicator $L_1$ that can be an LED and further includes an error indicator $L_2$. Both indicators $L_1$ and $L_2$ can be an LED or part of the display 24.

Figure 16:
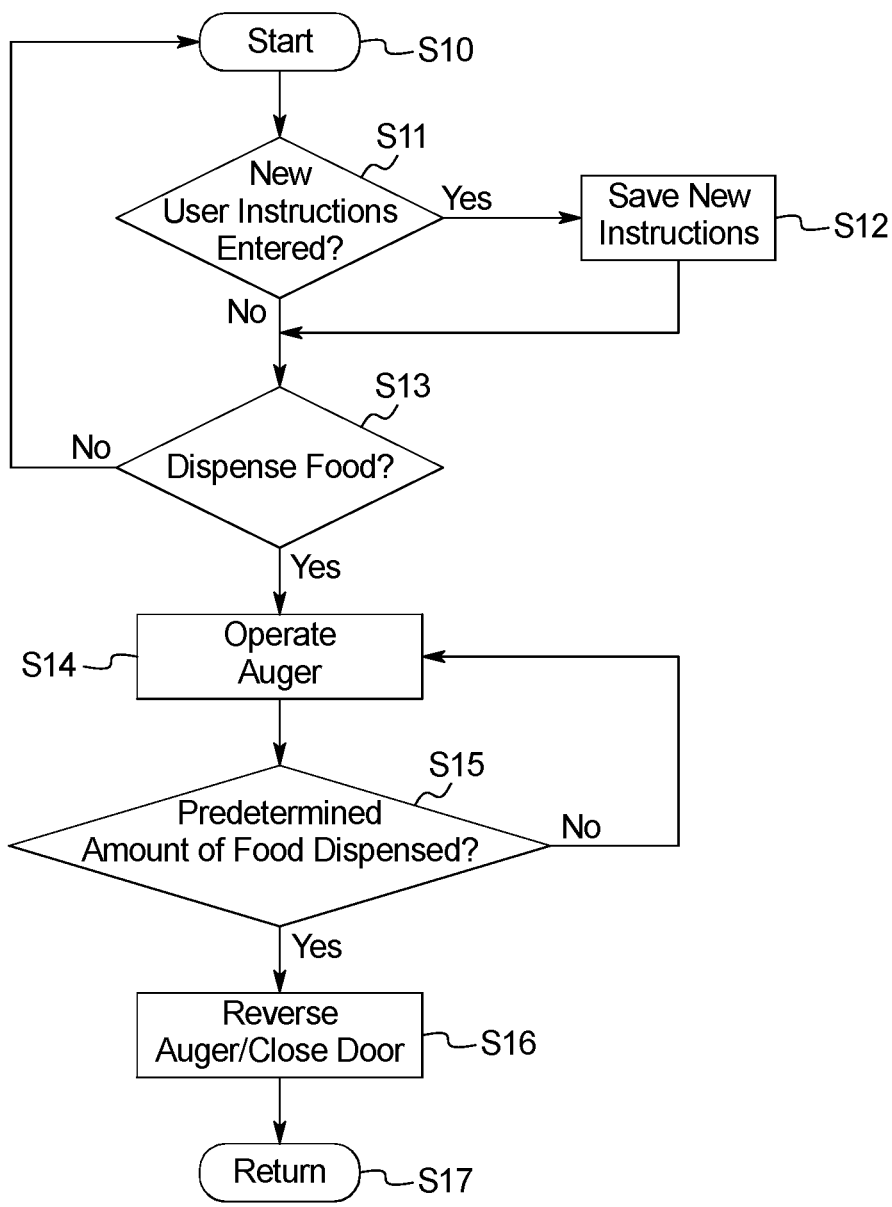
FIG. 16 is a flowchart showing one example of logic used by the electronic controller for operation of the pet feeder in accordance with the first embodiment.

A description of the flowchart depicted in FIG. 16 is now described. The logic depicted in FIG. 16 is a basic example of logic that can be programmed into, saved in memory or other used by the electronic controller 30.

At step S10, the electronic controller 30 is provided with power and starts up. At step S11, the electronic controller 30 displays in the clock section 80 a request as to whether or not a new user is now using the pet feeder 10, or if new programming instructions need to be entered? If yes, then operation moves to step S12 where the pet owner (or operator) can enter new instructions, such as frequency of feeding time (how often food is to be dispensed), the actual time the food is to be dispensed (when), how much food is to be dispensed and the speed of the auger 46 during dispensing. Clock settings and time display setting selections are also entered at this time and saved, if necessary. Operation then moves to step S13.

At step S11, if no instructions or settings are to be entered, operation also moves to step S13

At step S13, the electronic controller 30 checks the instructions saved to memory and determines whether or not food is to be dispensed. If no, operation returns to step S10 or S11. If yes, operation moves to step S14. At step S14 the motor 48 is operated by the electronic controller 30 at the selected speed in order to rotate the auger 46 to first open the door 50 and then dispense food. At step S15, the electronic controller 30 determines whether or not the entered amount (by weight) or appropriate amount of food has been dispensed. If not, operation returns to step S14 where dispensing continues. If yes at step S15, operation then moves to step S16 where electronic controller 30 reverses the rotational direction of the motor 48 thereby closing the door 50 and sealing the food therein from ambient conditions. The motor 48 of the auger 46 is then stopped by the electronic controller 30. Operation then moves to step S17 where the control logic returns to step S10.

It should be understood that the electronic controller 30 continuously monitors the signals from the weighing device 20. When the electronic controller 30 determines that the food container 14 (hopper 14) is empty, the electronic controller 30 operates the display 24 to indicate that it is time to refill the food container 14.

Figure 17:
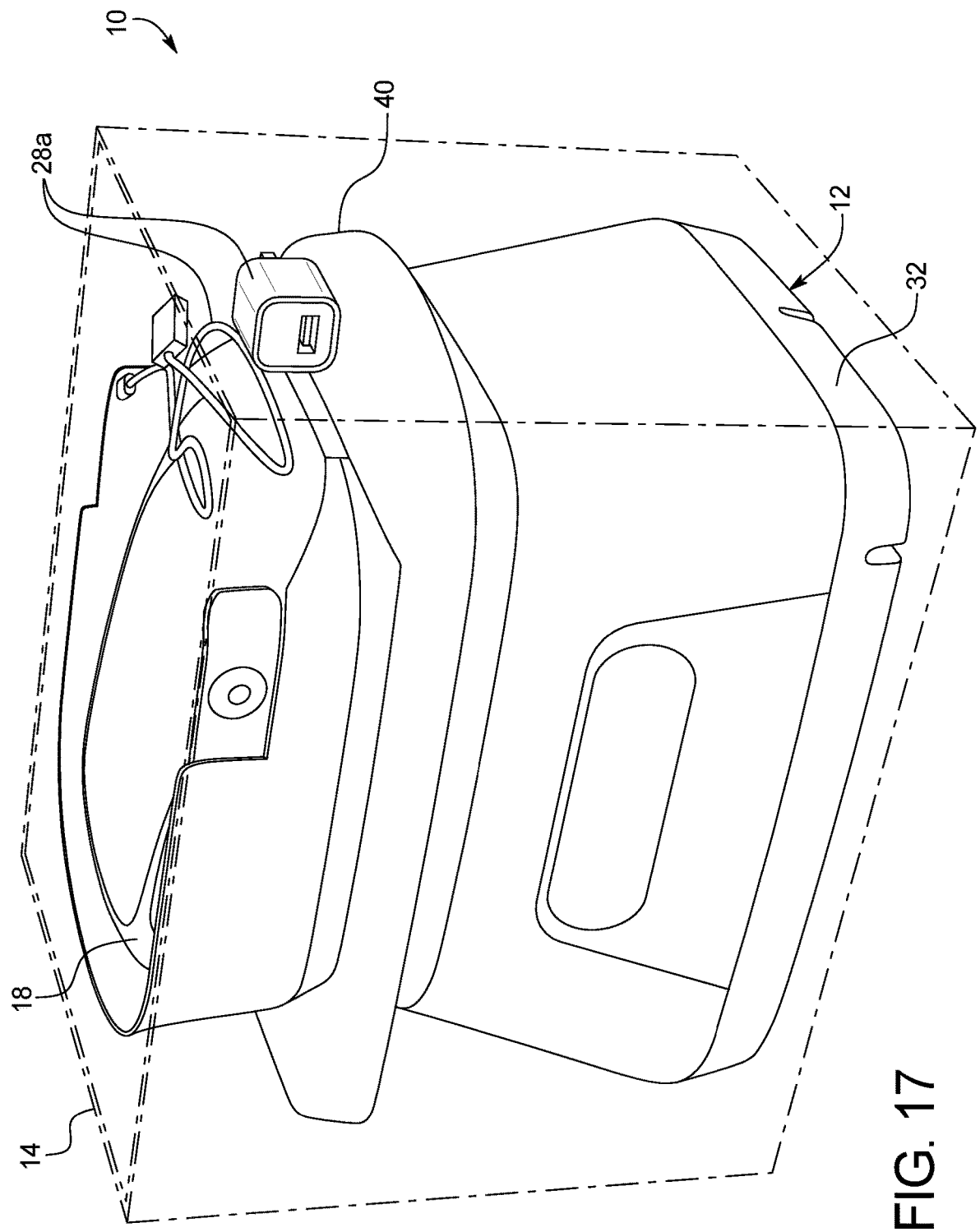
FIG. 17 is a perspective view of the pet feeder partially disassembled with the food container inverted for packing and/or storage in accordance with the first embodiment.

As shown in FIG. 17, the hopper 14 is removable from the base 12 and can be inverted such that the hopper 14 can nest over the base 12 and the funnel section 40. In this orientation, the pet feeder 10 can be more easily stored. Further since the overall volume occupied by the pet feeder 10 is reduced any packaging of the pet feeder during shipping is correspondingly reduced. Further, the hopper 14 protect the base 12 from damage during shipping. The removable hopper 14 also makes it easier to clean.

The basic steps for setting up and operating the pet feeder 10 is, for example, as follows:

1. The pet feeder 10 is unpacked, and the hopper 14 and the feeding tray 16 are connected to the base 12.

2. The power source 28 is connected and activated to supply power to the base 12.

3. A user or pet owner fills hopper 14 with dry pet food (no weight is recorded). The food is supported by the baffle 52 and enters the opening in the base 12, so that it contacts and is feed into the auger chute 38 and auger 46.

4. The user or pet owner sets portion size or uses pre-set feeding amount (based on weight) using the input panel 26 and the display 24 to set appropriate amounts or select from a preprogrammed set of options.

5. Just before scheduled feeding, the electronic controller 30 calculates the weight of the hopper 14 based on signals from the weighing device 20.

6. The pet feeder 10 then dispenses food while monitoring the weight of food dispensed, as described above. The auger 46 is rotated, opening the door and moving food along the auger chute 38 and through the door 50 into the feeding tray 16.

7. Once the selected predetermined weight of the food is dispensed, the electronic controller 30 stops feeding and reverses the motor 48 (the direction of rotation of the auger 46).

8. Reversing the motor 48 automatically closes internal food door 50.

9. Further, if the electronic controller 30 determines no food (weight) is being dispensed, the electronic controller 30 automatically reverses direction of rotation of the motor 48 and the auger 46 momentarily to clear any jams, then again reverses rotation of the motor 48 and auger 46 in order to again dispense food.

10. If electronic controller 30 weighs a completely empty hopper 14 and chute 38, then the display 24 displays that the hopper 14 is empty (nee to FILL).

As can be understood, the motor 48 and auger 46, as well as other elements disposed within the base 12, can be low within the base 12, and the auger 46 can be oriented at a low angle of inclination to dispense the food. This configuration enables the pet feeder 10 to have a low center of gravity makes the pet feeder 10 more stable and more resistant to tipping, as compared to other food dispensing units. This configuration also results in a reduction of size for shipping.

The auger 46 of the pet feeder 10 can have a "slow" feeder setting, which dispenses food a little at a time over a predetermined time (e.g., a minute or several minutes). Such a setting can be accomplished since the electronic controller 30 is preprogrammed with a weight to dispense. For example, the electronic controller 30 can be programmed to dispense 6 ounces of food over a 2 minute period at several intervals.

The electronic controller 30 can be preprogrammed with mealtimes and meal sizes. The meals can be the same size or differing sizes. In one embodiment, the electronic controller 30 can dispense two meals the same size one right after another, in an attempt to control the speed at which an animal eats or separate the meals by several hours.

The electronic controller 30 can have preset meals in memory, or the size of the meal can be input by the user (the pet owner). Thus, the electronic controller 30 can be set to fee a large animal or small animal with preset size amounts. The electronic controller 30 can have preset mealtimes or can be programmed with mealtimes, as desired.

The configuration of the described pet feeder 10 (in particular the rubber auger 46) reduces or eliminates jamming and is an improved feeder. The pet feeder 10 includes gaskets (seals) at top and bottom of the hopper and on the feeder door 50 in order to maintain freshness of the food. Moreover, the accuracy of the weighing device 20 enables a precise determination of food being dispensed to facilitate monitoring and controlling of an animal's diet.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. An automatic pet feeder, comprising:
   a base including an electric motor;
   a feed auger disposed for rotating movement within the base, the feed auger being operably connected to the electric motor so that the electric motor selectively operates the feed auger, the feed auger including a door within the base that is movable between an open position such that food can move out of the feed auger and into the food dish and a closed position covering the feed auger and sealing food therein;
   an electronic controller connected to the electric motor the electronic controller being configured to operate the electric motor to rotate the feed auger in a first direction opening the door and moving food through the feed auger and a second direction closing the door;
   a food container connected to the base; and
   a food dish connected to the base with the feed auger being configured to selectively move food from the food container to the food dish.

2. The automatic pet feeder according to claim 1, wherein the electronic controller includes an electronic display/input panel configured to receive user inputted instructions including a specific amount of food and specific time to dispense food from food container to food dish.

3. The automatic pet feeder according to claim 1, wherein the base includes at least one weight sensor positioned and configured to measure weight of the food container and food contained therein.

4. The automatic pet feeder according to claim 1, wherein the feed auger includes a door within the base that is movable between an open position such that food can move out of the feed auger and into the food dish and a closed position covering the feed auger and sealing food therein.

5. The automatic pet feeder according to claim 1, wherein the base includes an opening that is open to both the feed auger and the food container, and the food container includes a baffle located therein above the opening.

6. The automatic pet feeder according to claim 1, wherein the food container includes a removable lid that includes seals extending around a perimeter thereof such that with the removable lid installed to the food container, the seal creates a seal between an interior of the food container and an exterior of the food container.

7. An automatic pet feeder, comprising:
a base including an electric motor;
a feed auger disposed for rotating movement within the base, the feed auger being rotatable via operation of an electric motor, the feed auger including a door within the base that is movable between an open position such that food can move out of the feed auger and into the food dish and a closed position covering the feed auger and sealing food therein;
a food container connected to the base;
a food dish connected to the base with the feed auger being configured to selectively move food from the food container to the food dish; and
an electronic controller configured to operate the electric motor in order to move food from within food container to the food dish, the electronic controller being configured to operate the electric motor to rotate the feed auger in a first direction opening the door and moving food through the feed auger and a second direction closing the door.

8. The automatic pet feeder according to claim 7, wherein the electronic controller includes an electronic display/input panel configured to receive user inputted instructions including a specific amount of food and specific time to dispense food from food container to food dish.

9. The automatic pet feeder according to claim 8, wherein the base includes at least one weight sensor positioned and configured to measure weight of the food container and food contained therein, the at least one weight sensor being electronically connected to the electronic controller.

10. The automatic pet feeder according to claim 7, wherein
the feed auger includes a door within the base that is movable between an open position such that food can move out of the feed auger and into the food dish and a closed position covering the feed auger and sealing food therein.

11. The automatic pet feeder according to claim 7, wherein
the base includes an opening that is open to both the feed auger and the food container, and
the food container includes a baffle located therein above the opening.

12. The automatic pet feeder according to claim 7, wherein
the food container includes a removable lid that includes seals extending around a perimeter thereof such that with the removable lid installed to the food container, the seal creates a seal between an interior of the food container and an exterior of the food container.

* * * * *